Feb. 22, 1966 A. SHAFRITZ ETAL 3,237,014

SPECIAL FIRST STAGE OF MAGNETIC CORE BINARY COUNTER

Filed Oct. 14, 1959 2 Sheets-Sheet 1

INVENTORS,
HANS B. MARX
ARNOLD SHAFRITZ

BY Harry M. Saragovitz

ATTORNEY

NEGATION

DELAY

EXCLUSIVE OR

*INVENTORS,*
HANS B. MARX
ARNOLD SHAFRITZ

United States Patent Office 3,237,014
Patented Feb. 22, 1966

3,237,014

SPECIAL FIRST STAGE OF MAGNETIC CORE BINARY COUNTER

Arnold Shafritz, Merion, and Hans B. Marx, Berwyn, Pa., assignors to the United States of America as represented by the Secretary of the Army Filed Oct. 14, 1959, Ser. No. 846,519
5 Claims. (Cl. 307—88)

This invention relates to magnetic memory circuits and more specifically to input circuits for binary counters.

In conventional binary counters a need often arises to count input pulses the repetition frequency of which is a multiple $n$ of the repetition frequency of the existing clock pulses. Two methods are usually employed for the solution of this problem.

The first method consists in multiplying the clock pulse repetition rate, i.e., in making the clock pulse repetition rate equal to the repetition rate of the pulses desired to be counted. The employment of this method, however, results in a decrease of efficiency, and increase in the operating power requirements, and especially in the introduction into the system of an appreciable amount of noise. In many applications, particularly in field installations of military equipments, these disadvantages make the first method highly undesirable.

The second method consists in reading-out every core of the first binary counter stage a number of times equal to the multiple $n$. This second method requires special cores and, therefore, its usefulness is reduced to applications in which the standardization of cores is of little consequence. Moreover, this method has the additional drawback of introducing into the computer system an appreciable amount of undesirable noise.

It is therefore an object of this invention to provide a preliminary input network for the reception and distribution of the incoming pulses which avoids the above mentioned highly undesirable disadvantages of the existing methods.

In accordance with this invention the binary counter used in conjunction with the preliminary network is of conventional design and includes at least the regular first and second binary stages. Four clock pulses, A, B, C and D are provided, each occurring at the clock repetition rate. A and C are "independent" pulses and B and D are "slave" pulses since they are triggered by A and C, respectively. The preliminary network comprises an EXCLUSIVE OR circuit, a first and a second core each performing the NEGATION function and three delay cores. The incoming count pulses are applied simultaneously to the input of the first NEGATION core and to one input of the EXCLUSIVE OR circuit, a second input of which is connected to an output of the first negation core. A first output of the EXCLUSIVE OR circuit is fed to a first input of the second NEGATION core. A second output of the EXCLUSIVE OR circuit is applied simultaneously to the second input of the NEGATION core and through two delay cores to the second stage of the binary counter. The output of the second NEGATION core is fed through a third DELAY core to the first stage of the binary counter. It should be noted that in the preceding general description the terms "input" and "output" exclude the incoming clock or timing pulses.

The nature of this invention will be more fully understood from the following detailed description and by reference to the accompanying drawings in which.

Figure 1:
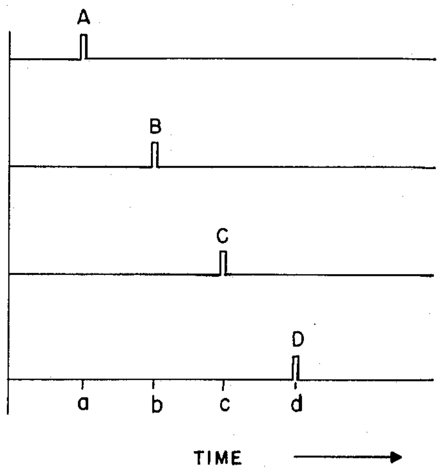
FIGURE 1 is a graph of the relative time positions of the clock pulses.

In FIGURE 1, clock pulses A and C are derived from the basic clock source of the counter and B and D are obtained from secondary sources which are triggered by A and C, respectively. In the actual equipment the repetition frequency of the clock pulses was 48 kc., and that of the count pulse was 96 kc.; the clock was synchronized with the input count and, therefore, the count pulses occurred at $a$ time and $c$ time. The stream of the count pulses may start and end at either $a$ or $c$ time. Hence the following combinations are possible:

(1) First count pulse at $a$, last count pulse at $c$,
(2) First count pulse at $a$, last count pulse at $a$,
(3) First count pulse at $c$, last count pulse at $c$,
(4) First count pulse at $c$, last count pulse at $a$.

If the count is even, the first stage of the counter, or least significant digit, will be ZERO. If the count is odd, the first counter stage will be ONE. In case 1 above, since every A count pulse is followed by a C count pulse, the count will be even. In cases 2 and 3 the counts will be odd, since an A pulse will not be followed by a C pulse, and vice versa. Finally, in case 4 the count will be even because the first count pulse C is not preceded by an A pulse, and the last A pulse is not followed by a C pulse.

Figure 2:
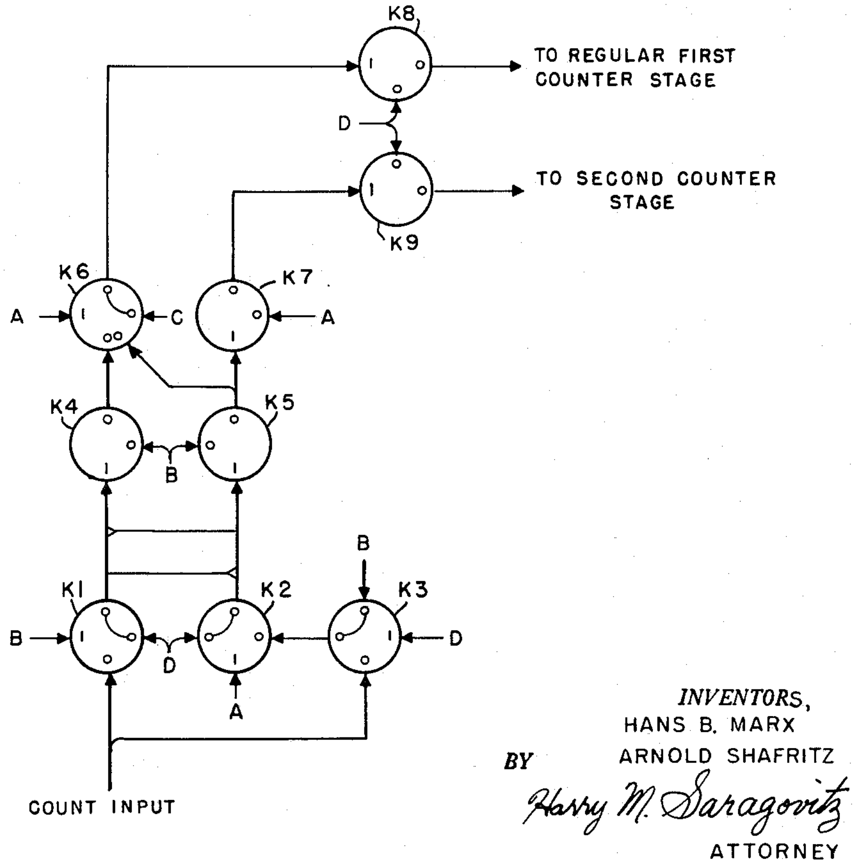
FIGURE 2 is a "logic" diagram of the circuit in accordance with this invention.

If the input to the first binary counter stage is designated by $S_1$ and the input to the second stage by $S_2$, then the "logical" functions performed by the circuit of this invention can be expressed by the following "logical" formulae:

(1) $S_2 \equiv (A \cdot C)$; and
(2) $S_1 \equiv [\sim(A \equiv C)] \equiv (A \not\equiv C) \equiv [(\sim C \cdot A) \cdot V(C \cdot \sim A)]$ In FIGURE 2 is shown symbolically a preferred arrangement of the magnetic cores for performing the "logical" functions expressed by the above algebraic expressions. The meaning of the symbolic representation and the nomenclature used in this specification is now well standardized and may be found clearly described by D. Loev et al. in the Proceedings of the IRE, February 1956, pages 154–162.

Figure 3:
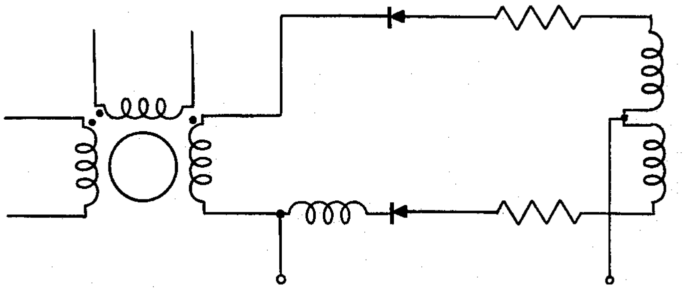
FIGURE 3 is a schematic representation of a conventional magnetic core NEGATION circuit.

There are nine cores K1 through K9 which may comprise the type of magnetic core shown in FIG. 3. It is to be understood, however, that any well-known type of magnetic core other than the type shown in FIG. 3 may be utilized. Cores K1, K2, K4 and K5 constitute the EXCLUSIVE-OR circuit. Cores K3 and K6 have been previously referred to in the foregoing description as the first and the second NEGATION cores, respectively. Cores K7, K8 and K9 perform only delaying functions.

Figure 4:
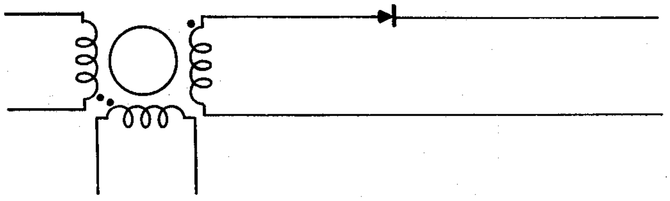
FIGURE 4 is a schematic representation of a conventional magnetic core DELAY circuit.
Figure 5:
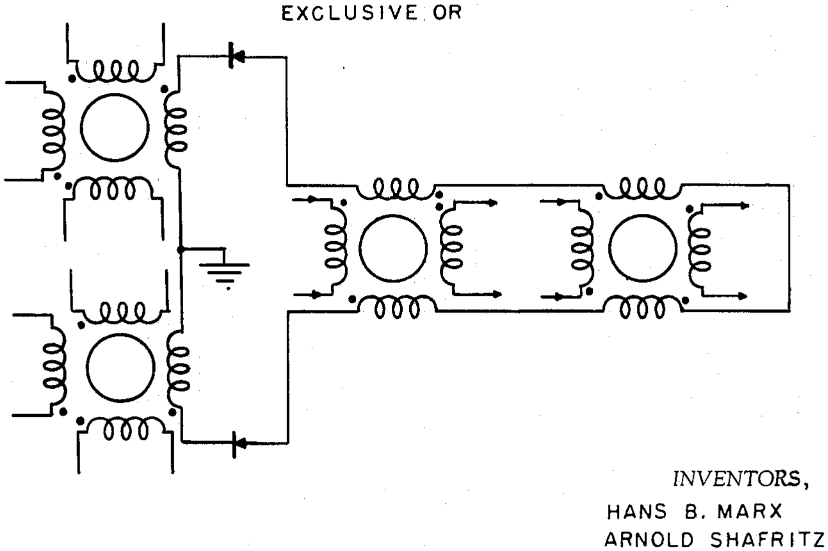
FIGURE 5 is a schematic representation of a conventional magnetic core EXCLUSIVE OR circuit.

FIGS. 3, 4, and 5 are schematic diagrams of conventional magnetic core NEGATION, DELAY, and EXCLUSIVE OR circuits respectively. These schematic diagrams are included for purposes of illustration only. Any conventional magnetic core circuits capable of performing the logic functions denoted by FIG. 2 can be utilized. Our invention resides in the specific arrangement of the logic circuits and in the manner in which the various inputs are applied.

In operation, the input pulses to be counted are applied simultaneously to K1 and K3. The three possible situations which may occur will now be separately analyzed.

For every pair of count pulses, the first of which occurs at A time and the second at C time, an output pulse will reach the second binary stage. At A time core K2 is set to the ONE state. At the previous D time core K3 was put to the ONE state. The first count pulse occurring at A time switches core K3 to the ZERO state. At time B a ONE is inserted into core K1, and K3 is read out. At the following C time core K1 is returned to the ZERO state by the count pulse occuring at that time. The next D time cores K1 and K2 are read out. Since there will be only a ONE in K2, a ONE will be inserted into core K5, which is read out at time B. K6 has been set to the ONE state at A time. The output from K5 returns K6 to ZERO. The K5 output pulse advances through delay cores K7 and K9 to the second binary stage. Core K7 and K9 are read out at times A and D respectively. The input to the second binary stage satisfies the "logical" function expressed by Formula 1.

If the first count pulse occurs at C time, the ONE that has been inserted into K3 by the D pulse will be read out at time B. Core K1 will be cleared by the count pulse at C time. At D time both cores K1 and K2 will be in the ZERO state and, therefore, there will be no output from cores K4 and K5 to switch core K6 to the zero state at time B. The ONE inserted into K6 at A time will be read out at C time and forwarded through delay core K8 to the regular first stage of the binary counter. This satisfies the conditions for $S_1$, namely $C.{\sim}A$.

If the last count pulse occurs at A time, core K1 which is in the ONE state due to the B pulse, will not be returned to ZERO since no count pulse will arrive at C time. Since both cores K1 and K2 will be in the ONE state at the reading out time D, K4 and K5 will not switch to the ONE state and, therefore, will produce no output into cores K6 and K7. This last result is due to the EXCLUSIVE-OR function performed by cores K1, K2, K4 and K5. It follows that K6 will not be cleared at B time, but will be read out at C time. The output pulse from K6 will be forwarded through delay core K8 to the regular first stage of the binary counter. This satisfies the second condition for $S_1$, namely, $A.{\sim}C$.

During the time when no count pulses occur, K4 and not K5 will produce an output pulse. The K4 output pulse will clear core K6 and thereby prevent a count insertion into the regular stages of the binary counter.

In the above description it was shown that whenever the count is even there will be an input to the second binary stage and whenever the count is odd there will be an input to the first binary stage. These results satisfy the "logical" functions expressed by Formulae 1 and 2.

Cores K3 and K6 perform the NEGATION function because K3 produces *no* output whenever it receives an input count pulse, and K6 produces *no* output whenever it receives an input pulse from either K4 or K5.

Cores K7, K8, and K9 are only used for delaying and synchronization purposes, since the pulses are received by the binary counter only at predetermined intervals. Cores K1, K2, K4 and K5 perform the EXCLUSIVE-OR function which means that whenever cores K1 and K2 contain either a ONE or a ZERO at the read-out time no advance pulse will be produced by either K4 or K5.

What is claimed is:

1. A magnetic core network for feeding incoming pulses to be counted to a binary counter having at least a first and a second counter stage, said incoming pulses having a repetition frequency which is a multiple of existing clock pulses in said counter, said network comprising: an EXCLUSIVE OR circuit having a first and a second input and a first and a second output; a first NEGATION core having an input and an output, a second NEGATION core having a first and a second input and an output; two series connected delay cores having an output; and a third delay core; said output of said first NEGATION core being applied to said first input of said EXCLUSIVE OR circuit, said first output of said EXCLUSIVE OR circuit being applied to said first input of said second NEGATION core, and said second output of said EXCLUSIVE OR circuit being applied simultaneously to said second input of said second NEGATION core and to said two series connected DELAY cores whose output is applied to said second counter stage; and said output of said second NEGATION core being applied through said third DELAY core to said first counter stage.

2. The combination of claim 1 and including means for applying simultaneously said incoming pulses to be counted to said second input of said EXCLUSIVE OR circuit and to said input of said first NEGATION core.

3. The network of claim 2 wherein said first and said second NEGATION cores are capable of assuming either a first or a second state of magnetic remanence, said first and second states being of opposite polarities.

4. The network of claim 3 wherein said first NEGATION core is set to said first state of magnetic remanence in response to said incoming pulses to be counted.

5. The network of claim 4 wherein said second NEGATION core is set to said first state of magnetic remanence in response to either said first or said second output of said EXCLUSIVE OR circuit.

References Cited by the Examiner

UNITED STATES PATENTS

| | | | |
|---|---|---|---|
| 2,897,483 | 7/1959 | Loev | 307—88 X |
| 2,905,833 | 9/1959 | Miehle | 307—88 |
| 2,920,314 | 1/1960 | Miehle | 307—88 X |
| 2,920,824 | 1/1960 | Lanning | 340—174 X |
| 2,920,825 | 1/1960 | Lanning | 340—174 X |
| 2,921,297 | 1/1960 | Lund | 340—174 |
| 2,994,855 | 8/1961 | Kline et al. | 307—88 |

OTHER REFERENCES

Publication, Proceedings of the IRE, vol. 44, February 1956, pages 154–162.

IRVING L. SRAGOW, *Primary Examiner.*

EVERETT R. REYNOLDS, *Examiner.*

L. M. DALGARN, R. R. HUBBARD, M. S. GITTES, *Assistant Examiners.*